US005540317A

United States Patent [19]

Braden et al.

[11] Patent Number: 5,540,317

[45] Date of Patent: Jul. 30, 1996

[54] MACHINE TO DETECT AND PROCESS TO CORRECT CAPACITOR CHIP MISALIGNMENT IN LOADING FOR PROCESSING

[75] Inventors: Denver Braden, San Marcos; David M. Brooks, Vista; Romulo V. DeVera, San Diego, all of Calif.

[73] Assignee: Chipstar, Inc., San Marcos, Calif.

[21] Appl. No.: 373,445

[22] Filed: Jan. 17, 1995

[51] Int. Cl.[6] .................. B65G 47/14

[52] U.S. Cl. .................. 198/393; 198/464.4

[58] Field of Search .................. 198/395, 384, 198/393, 396, 397, 464.4, 444, 483.1; 221/79, 88

[56] References Cited

U.S. PATENT DOCUMENTS

| | | | |
|---|---|---|---|
| 3,889,846 | 6/1975 | Strack | 221/79 |
| 4,238,023 | 12/1980 | Millar et al. | 198/393 X |
| 4,673,077 | 6/1987 | Taniguchi | 198/393 |

*Primary Examiner*—D. Glenn Dayoan

*Attorney, Agent, or Firm*—John J. Murphey; Murphey Law Offices

[57] ABSTRACT

In a capacitor chip processing apparatus, including a rotating loading wheel mounted on a spindle and carrying an inventory of chips, passageways formed in the wheel for receipt of chips from the inventory in controlled alignment, a belt containing resilient masks and having chip receiving holes brought into registration with the passageways, and motor-driven loading pins to advance, during the loading cycle, to push the chips from the passageways into the holes, a subassembly machine to detect and correct chip misalignment in the passageways, containing a load cell in communication with the loading pins and arranged to measure the resistance to pin travel as the pins come in contact with the chips in the passageways, a computer apparatus to compare the measured real time resistance to pin travel with a set resistance value from a list of absolute values or empirical studies, and a controller apparatus, activated by the computer apparatus, to control the motor-driven loading pins and the loading wheel in a remedial program to cure the misalignment of the chip in the passageway.

9 Claims, 3 Drawing Sheets

MACHINE TO DETECT AND PROCESS TO CORRECT CAPACITOR CHIP MISALIGNMENT IN LOADING FOR PROCESSING

BACKGROUND OF THE INVENTION

1. Field of the Invention

This invention pertains to the field of capacitor chips and machinery that loads them into holders or masks for conveying them through various treatment processes. More particularly, this invention is a computer-driven combination of elements that ensures the chips are not loaded askew or in the wrong size masks such that they, or various parts of the equipment, suffer damage.

2. Description of the Prior Art

In the computer industry, circuit board components are continually being shrunk so that they can either be made to occupy less space on circuit boards or the boards constructed to contain more components and thus be more powerful. In both cases, there is continual pressure to shrink the size of the components, such as capacitors, resistors, etc., that are made a part of the circuitry. Long ago, in the shrinking process, some of these components lost their terminal wires so that many of them are now directly connected to the circuit board through soldering.

A typical capacitor chip is now about 0.060 inches long and 0.030 inches on a side. For processing the chips to be able to be later soldered directly onto a circuit board, each end of the chip must be metalized to a depth of about 0.012 inches. Large numbers of these chips may be subject to this metalization process using the apparatus described and claimed in U.S. Pat. No. 5,226,382 (the '382 patent). In this apparatus, an endless metal belt is used that contains a plurality of soft, rubbery masks that have individual holes formed in them into which the chips are individually loaded. The belt carries the chips through dobbing stations where a smear of a small amount of metalizing paste is placed on the ends thereof and then carries them through an oven to dry them. Subsequently, they are fired in a high temperature furnace to make the paste hard and capable of direct heat soldering onto a metalized landing formed on the circuit board.

In the apparatus of the '382 patent, an upright hollow load bowl or wheel, defined by an outer thin cylindrical metal wall, is mounted on a spindle driven by a stepper motor in a rotary motion. A series of orifices or passageways are formed in the cylindrical wall, preferably in a pattern matching the pattern of second apertures or openings in the rubber masks that are carried on the endless belt, and the passageways and openings are brought into alignment for a short time. The size of the opening in the metal bowl is slightly larger than the cross-section of the chip. An inventory of capacitor chips are maintained in the lower part of the load wheel. The wheel is subject to vibration or other such movement during its rotation about the spindle to urge the loose chips to drop into the passageways. The passageways may or may not have an angled lead-in opening transitioning from the inside surface of the cylindrical wall to the passageways themselves to aid in aligning chips for movement into the passageways. A chip retaining wall or surface is placed against the outside surface of the lower part of the load wheel to prevent the chips in the passageways from falling through. The mask in the endless belt is brought into alignment just as the load wheel passes out of contact with the chip retaining wall. A loading pin or pins, axially aligned above the passageways, then descends into the passageways to push the chips into the smaller holes in the resilient masks that are aligned therewith. The pins then are retracted from the passageways and the load wheel indexed to the next chip-filled holes and the process repeated.

A problem has arisen in the loading of the chips into the passageways. Due to the decreasing size of the chips, there is an increasing occurrence of chips becoming misaligned in the passageways. These chips are hard; the thin cylindrical wall of the load wheel does not have sufficient metal to resist deformity when one of these hard chips is forced askew into the passageway by the load pin. The result is usually a bent pin, a deformed passageway, or a crushed chip that interferes with later loading. While one or two of such instances is not that troublesome, continued creation of more damaged passageways will soon cause significant deterioration of the loading cycle.

While the size of the passageways can be reduced to improve initial alignment, filling begins to suffer and fewer passageways become filled with chips, thus decreasing overall output. A stronger load wheel could be manufactured to resist deformation, but this raises cost of operation.

A second problem comes about when the belt, and its masks, are changed for a new belt to handle a different size chip. The size of the holes in the new masks may be too small to receive the chip without undue pressure applied by the loading pins. This would result in crushed pins or torn masks. This could occur when the operator is unfamiliar with the new chip and its relation to the openings in the new belt and masks.

SUMMARY OF THE INVENTION

This invention is a unique, computer-controlled chip loading subassembly for use with chip terminating apparatuses of the type disclosed and claimed in the '382 patent and the like. The invention also involves the process of clearing the misaligned chip or oversized chip from the passageway to allow production to continue. It involves the use of a load cell to measure the resistance to moving the chip into the passageway in the load wheel and then comparing that value of resistance to other known values of resistance in the loading cycle. Means are provided to compare the measured value of the instant loading operation and, when the comparison discloses an unexplainable increase in the value, the computer directs the loading cycle to terminate or undergo a change in action of a remedial nature. In another embodiment of this invention, another set of pins are located on the opposite side of the mask and are driven into the openings in the mask, pass through them into the passageways in the cylindrical wall of the load wheel, and move the chips back out of the passageways in an unloading action. The remedial change in action may take the form of vibrating the load wheel, to jiggle the chips and improve their alignment in the passageways, and/or bring the load pins down onto the chips in a series of light contacts, to urge the chips into axial alignment.

This unique invention can be retro-fitted on existing apparatus. It is totally computer-controlled, so that operating personnel need only a small amount of training and do not have an increased work load placed upon them. Its sole purpose is to save chips and reduce damage to the load wheel and pins so that its initial cost will be quickly repaid in reduced down time. It operates in a fast accelerate and decelerate mode so that production rates are insignificantly affected and it reduces down time and overall maintenance thus improving productivity and holding down operational costs.

Accordingly, the main object of this invention is a unique machine that detects misalignment of a capacitor chip in the load wheel of an automatic capacitor chip terminal end metalizing apparatus, or the mismatching of a chip with a mask, and shifts the operation of the apparatus into a corrective action or, ultimately, into a shut down before damage occurs to the load wheel or pins. Other objects of the invention include a machine that measures the resistance to loading one or more chips in load passageways, in real time, and compares the value obtained to other values already established for a successful production run; a machine that may cause unloading of the chips before damage occurs in the loading cycle; a machine that will undergo vibratory movement, low energy loading movement, or other remedial actions to correct the misalignment problem and allow production to continue; a machine that may be retro-fitted onto existing machines; require little maintenance, and little training of operating personnel; and, a machine that improves productivity by reducing down time due to crushed capacitor chips caused by misalignment in the load wheel.

These and other objects of the invention will become more apparent when reading the description of the preferred embodiment along with the drawings that are appended hereto. The scope of protection sought by the inventor may be gleaned from a fair reading of the claims that conclude this specification.

DESCRIPTION OF THE PREFERRED EMBODIMENTS

Figure 1:
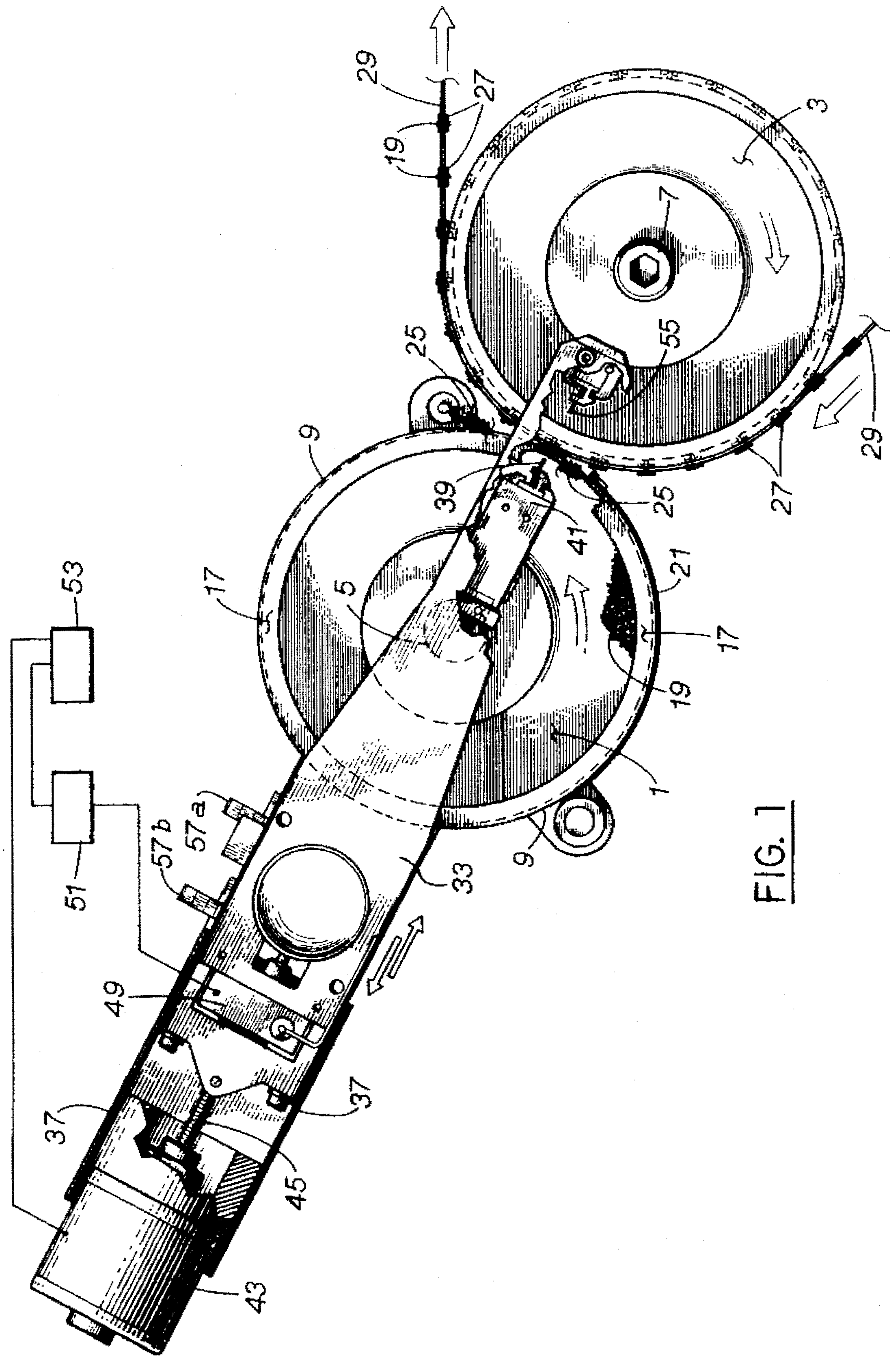
FIG. 1 is an illustrative side view, partially in section, of the preferred embodiment of the invention shown attached to a capacitor chip terminal end metalizing apparatus of the type generally disclosed in the '382 patent.
Figure 2:
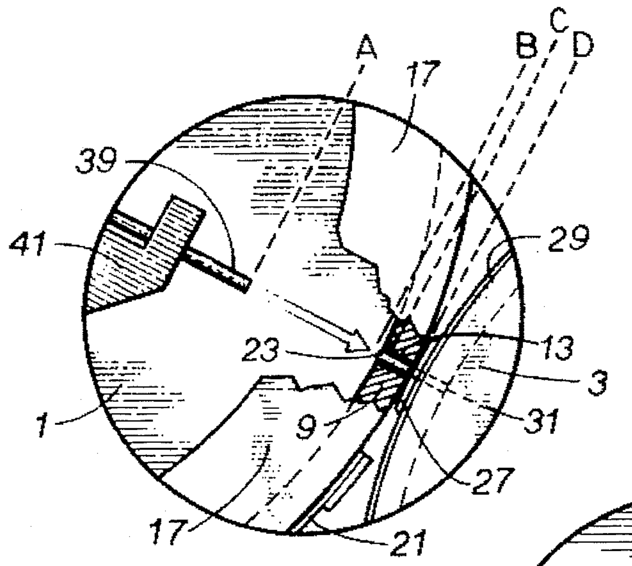
FIG. 2 is a close-up illustrative side view of the area of the load wheel where the capacitor chip is transferred from the load wheel to the mask in the endless belt.
Figure 3:
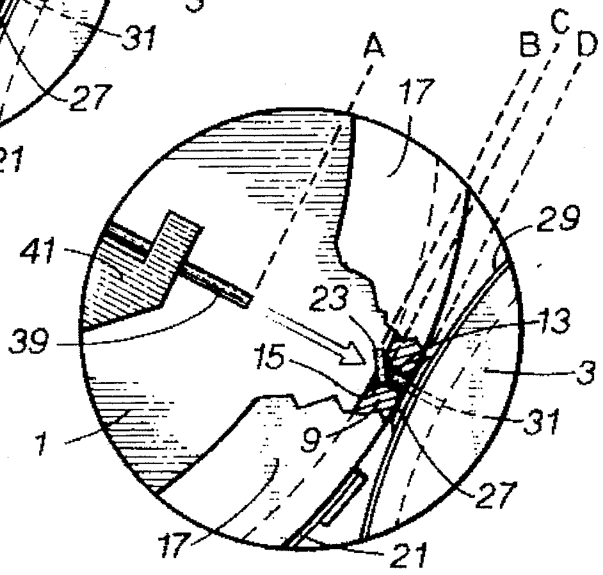
FIG. 3 is a close-up illustrative view, similar to that of FIG. 2, showing a chip misaligned in a passageway.

Turning now to the drawings where like elements are identified with like numerals throughout the eight figures, FIG. 1 shows a bowl-shaped load wheel 1 in tangential contact with a main drive pulley wheel 3, said wheels mounted in upright arrangement on separate spindles 5 and 7 respectively, for rotation in the direction of the arrows applied thereto similar to that shown in U.S. Pat. No. 5,226,382. As shown in FIGS. 1–3, load wheel 1 is bounded by a thin metal cylindrical wall 9 having at least one but preferably a plurality of small passageways 13 formed radially therethrough. As shown in FIG. 3, these passageways may have an angled lead-in 15 located at the inside surface of wall 9, however, as shown in FIG. 2, such a lead-in is not always needed or used.

A small retaining wall 17 is located at the open front of load wheel 1 to aid in retaining an inventory of loose capacitor chips 19 at the bottom of wheel 1 and in contact with passageways 13. The shape of passageways 13 are elongated so that the elongated capacitor chips will enter them in an axially aligned manner. The passageways are usually circular in cross-section and are usually set between 0.0040 to 0.0080 inches, and preferably about 0.0060 inches greater in diameter than the diagonal width of the chip. The chip is the same as shown in FIG. 14 of U.S. Pat. No. 5,226,382. A chip retaining sleeve 21 is biased against the outside surface of cylindrical wall 9 and held thereagainst by springs 25. Sleeve 21 extends from below chip inventory 19 to a point just short of where load wheel 1 and pulley wheel 3 come into tangential contact.

In actual practice, load wheel 1 is periodically vibrated while turning through chip inventory 19 to urge the chips into passageways 13. Those that do move into axial position therein are retained in said passageways by sleeve 21 while wheel 1 moves up to contact the masks 27 mounted on an endless belt 29 that is carried temporarily by sprocketed pulley wheel 3. Sleeve 21 terminates just as passageways 13 come into contact and alignment with holes 31 formed in mask 27.

As shown in FIG. 1, a load arm 33 is mounted for reciprocal movement in a bracket 37 and extends downward in front of load wheel 1. One or more load pins 39 are mounted in an offset assembly 41 and aligned over a position to where passageways 13 index and where load wheel 1 is caused to stop momentarily during the loading cycle. A motor 43 is attached to bracket 37 and its drive shaft 45 is connected to load arm 33 such that when energized, motor 43 moves load arm 33 reciprocally forward to move load pin assembly 41 and load pins 39 toward load wheel wall 9 and allows pins 39 to enter passageways 13 and move the chips into mask holes 31. Motor 43 then moves load arm 33, its pin assembly 41 and load pins 39 rearward, out of passageways 13, to allow wheel 1 to advance with wheel 3 and index the next set of chip-filled passageways 13 over new, empty mask holes 31.

As shown in FIG. 3, under certain conditions and/or in certain instances, one or more chips 23 become misaligned in passageways 13 and, if not corrected, may damage pins 39, passageways 13, crush chip 23 or cause a combination of these problems. This invention is shown in the figures to comprise a load cell 49, using a transducer or other like component, interposed motor drive shaft 45 and load arm 33 to measure the resistance met by load pins 39 as they progress into passageways 13. The resistance felt by the load pins comes from the energy needed to press the chip 23 into small hole 31 formed in mask 27. When a chip is cocked or misaligned in passageway 13, the resistance to moving it through the passageway dramatically rises because, unlike the rubber masks, passageways 13 are formed in a metal wall and do not readily yield. This value is then sent to a computer 51 where it is compared to other resistance values previously set therein from either empirical data or other basis.

Because of the chips' small size, they do not project very high above the inside surface of cylindrical wall 9. Accordingly, there is no reason for load pins 39 to move at any speed other than high speed between a first home position A, shown in FIG. 2, and a second, lower position B just above the point where said pins would contact a misaligned chip. In addition, as there is no plan for contact between load pins 39 prior to position B with a chip, load cell 49 need not begin to measure resistance to further pin travel above position B.

Figure 4:
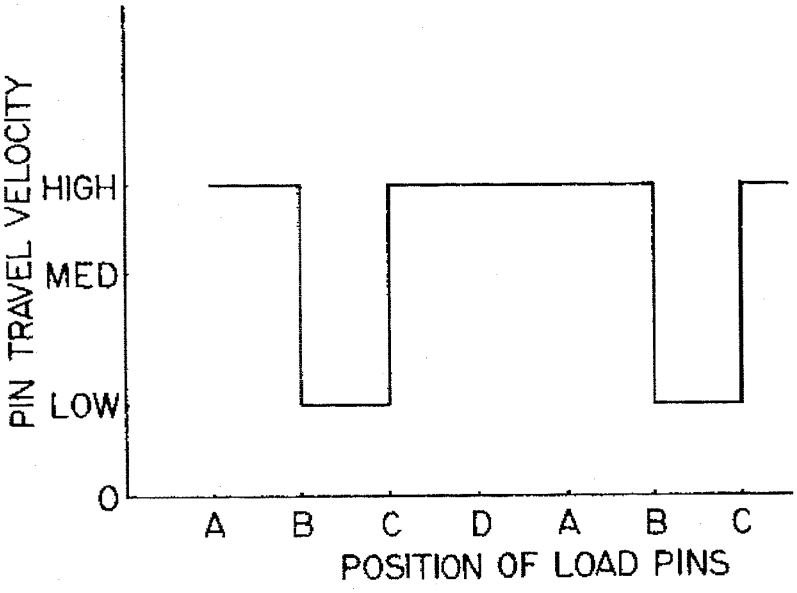
FIG. 4 is a graph showing velocity of load pin travel at various positions of the load pins; and, FIGS. 5*a*, 5*b*, 5*c* and 5*d* are samples of the logic flow patterns the controller uses to control the operation of the loading cycle.

Between second position B and third, lower position C is where load pins 39 will encounter misaligned chips. Accordingly, computer 51 is programmed to energized motor 43 to drive load pins 39 very slowly between positions B and C, and programmed to have computer 51 begin to read the resistance beginning at position B so that any chip encountered in a misaligned position will have its resistance to further movement into aligned position in passageway 13 measured by load cell 49. Once load pins 39 reach position C, the chip has been brought into alignment in passageway 13 so that there is no reason why load pins 39 shouldn't move at a faster speed to seat the chip into hole 31 in mask 27 at position D. FIG. 4 shows a graph of the speed of travel of load pins 39 between each of the pin positions shown in FIG. 2. This travel velocity may be used when no significantly high resistance to pin travel is measured by load cell 49.

When load pins 39 encounter a misaligned chip, the resistance to further load pin travel between positions B and C is measured by load cell 49 and the value is sent to computer 51. Computer 51 compares the measured resistance to values set in the computer. If the comparison shows a significantly high resistance, computer 51 generates a signal and sends it to a controller 53 that selects one or more remedial programs loaded therein to control motor 43, load wheel 1, load pins 39, etc. Four remedial programs are shown in FIGS. 5*a* through 5*d*, however, this invention contemplates other such programs as well as combinations of the first three programs shown.

Figure 5A:
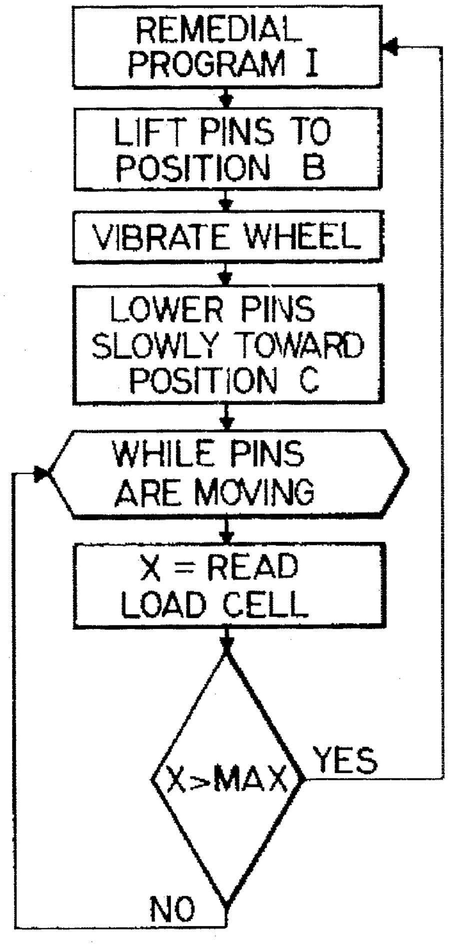

FIG. 5*a* shows a remedial program where, upon determination of a misaligned chip or excessive pin resistance, load pins 39 are immediately raised to position B and load wheel 1 is subject to a short duration of vibration centered about spindle 5. This vibration should result in urging the misaligned chip into proper axial alignment in passageway 13. Upon termination of the period of vibration, load pins 39 are once again made to travel slowly from position B towards position C. If no significant resistance to further load pin travel is measured during this slow travel, then, when load pins 39 reach position C, pin travel is increased to a maximum and they are moved from position C to position D, to seat the chips in mask holes 31, and then quickly retracted to home position A to await the next load cycle. If, however, significant resistance to further load pin travel is once again measured during this slow movement of load pins from position B toward position C, either the same remedial program as shown in FIG. 5*a* is repeated or another remedial program is commenced.

Figure 5B:
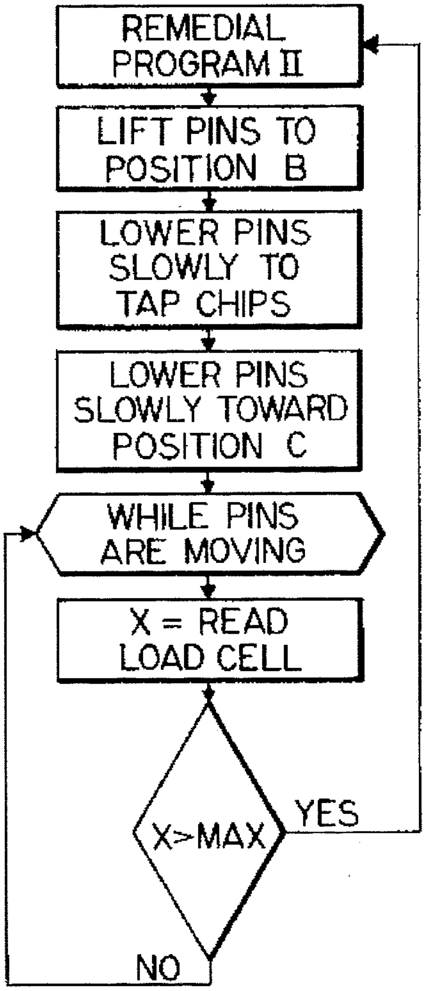

FIG. 5*b* shows another remedial program where, upon determination of a misaligned chip, load pins 39 are immediately raised to position B and then once again slowly lowered to the point where the high resistance was encountered. Load pins 39 are then caused to undergo a series of raising a few thousands of an inch and lowering a few thousands of an inch to the point of high resistance in a "bumping" or "tapping" series of actions to urge the misaligned chip into axial alignment in passageways 13. After a short duration of this "bumping" or "tapping" cycle, load pins 39 are once again slowly moved from position B toward position C. If no significant resistance to further load pin travel is measured during this slow travel, then, when load pins 39 reach position C, pin travel is increased to a maximum and they are moved from position C to position D, to seat the chips in mask holes 31, and then quickly retracted to home position A to await the next load cycle. If, however, significant resistance to further load pin travel is once again measured during this slow movement of load pins from position B toward position C, either the same remedial program as shown in FIG. 5*a* is repeated or another remedial program is commenced.

Figure 5C:
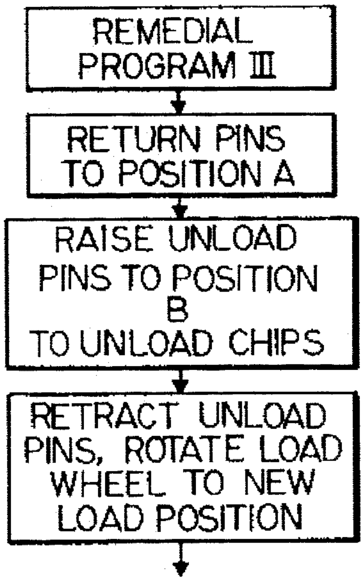

FIG. 5*c* shows another remedial program where, upon determination of a misaligned chip, load pins 39 are immediately raised to home position A. Another set of pins 55, termed "unload pins", extend from load arm 33 to the outside of load wheel 1 and opposite where mask 27 will be located during the load cycle and are arranged to match exactly the same pattern and location of load pins 39. In this remedial program, upon determination of a misaligned chip, load pins 39 are immediately raised to home position A and unload pins 55 are raised into contact with holes 31 in mask 27 and then raised further to drive the chips out of position in passageways 13 so as to completely unload passageways 13 of chips and allow them to fall down into the inside surface of load wheel 1 to rejoin the loose inventory 19 of chips gathered at the bottom thereof. Unload pins 55 are then retracted from mask 27 to their home position and load wheel 1 index to the next load position.

This last program is the most drastic program in that it completely unloads a mask of chips. It is contemplated that the remedial program shown in FIG. 5*a* and/or the program shown in FIG. 5*b* will be used, singularly or in combination, before the program shown in FIG. 5*c* instituted. In all cases, the remedial portion of the program takes but a few seconds so that, with the high speed travel of load pins 39 between positions A through D, and unload pins 53 between certain portions of travel, little production time is lost. A pair of electronic stops 55*a* and 55*b* are positioned on or near bracket 37 to monitor the travel of load arm 33 to prevent any wasted movement.

Figure 5D:
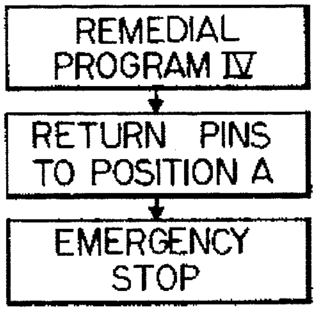

A fourth program, remedial in nature, is shown in FIG. 5*d* where, upon determination of a misaligned chip, the whole apparatus is immediately brought to an emergency halt so that the operator can clear the misalignment.

Additionally, this invention may be used to prevent damage to a newly coated (dried but not fired) chip as it is being transferred from one side of the mask to the other side or during the unloading stage. Computer 51 can read absolute pressure of the loading pins against the chip capacitors as well as resistance to pin travel. When programmed accordingly, pin travel can be controlled by computer 51 so as to maintain a constant pressure by continuously adjusting the velocity of the inset press pins during the loading cycle. This constant pressure is important because there is a point at which too much pressure, applied to the chip by the loading pins, will result in damage to the new coating, such as by peeling it off or smearing it over the outside of the chip.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the way to achieve substantially the same result are within the scope of this invention.

What is claimed is:

1. In a capacitor chip processing apparatus, including a rotating loading wheel mounted on a spindle and carrying an inventory of chips, passageways formed in the wheel for receipt of chips from the inventory in controlled alignment therein, a belt containing resilient masks having holes formed therein brought into registration with the passageways, and motor-driven loading pins to advance, during the loading cycle, to push the chips from the passageways into the holes, a subassembly machine to detect and correct chip misalignment in the passageways, comprising:

a) a load cell in communication with the loading pins and arranged to measure the resistance to pin travel as the pins come in contact with the chips in the passageways;

b) computer means to compare the measured real time resistance to pin travel with a resistance value set therein from a list of absolute values or empirical studies; and, c) controller means, activated by said computer means, to control the motor-driven loading pins and the loading wheel in a remedial program to cure the misalignment of the chip in the passageway.

2. The machine of claim 1 wherein said load cell is positioned between the drive motor and the loading pins and includes a transducer.

3. The machine of claim 1 further including a pair of electronic stop devices to control the fore and aft position of the loading pins during the loading cycle.

4. The machine of claim 1 where said computer and controller cause the motor to drive the loading pins at high speed from a first home position, spaced apart from the passageways, toward a position slightly above the passageways where they would contact a chip misaligned in one of the passageways.

5. The machine of claim 1 further including motor-driven unloading pins arranged to advance against the mask and enter the holes formed therein to push the chips out of position in the holes and the passageways.

6. In a capacitor chip processing apparatus, including a rotating loading wheel mounted on a spindle and carrying an inventory of chips, passageways formed in the wheel for receipt of chips from the inventory in controlled alignment therein, a belt containing resilient masks having holes formed therein brought into registration with the passageways, and motor-driven loading pins to advance, during the loading cycle, to push the chips from the passageways into the holes, a process for detecting and curing the misalignment of a chip in a passageway, comprising the steps of:

a) measuring the resistance to forward travel of the loading pins in the loading cycle;

b) comparing the measured real time resistance to pin travel with a resistance value established from a list of absolute values or empirical studies; and, c) creating a signal when the comparison discloses a high resistance to pin travel; and, d) sending said signal to a controller that has at least one remedial program stored therein to begin said remedial program to cure the high resistance.

7. The process of claim 6 wherein said remedial program includes the steps of:

a) raising the load pins to a position slightly above a level where they would encounter the high resistance;

b) vibrating the load wheel about the spindle for a short duration;

c) lowering the load pins into contact with the chips;

d) measuring the resistance to further load pin travel;

e) continuing to lower the pins, if no significant resistance is measured, to a point where the chips are moved to position in the holes of the mask; and, f) raising the load pins to a home position, out of contact with the chips, if the measured resistance is significantly above the resistance to movement of the pins in the preceding movements in the load cycle.

8. The process of claim 6 wherein said remedial program includes the steps of:

a) raising the load pins to a position slightly above a level where they would contact a misaligned chip;

b) lowering the load pins into contact with the chips;

c) causing the load pins to be raised a few thousands of an inch and then lowered a few thousands of an inch into contact with the chips in a "bumping" or "tapping" series of actions to urge the misaligned chip into axially alignment in the passageways;

d) continuing to lower the pins, if no significant resistance is measured, to a point where the chips are moved to position in the holes of the mask; and, e) raising the load pins to a "home" position, out of contact with the chips, if the measured resistance is significantly above the resistance to movement of the pins in the preceding movements in the load cycle.

9. The process of claim 6 wherein said remedial program includes the steps of:

a) raising the load pins to an upper "home" position out of contact with the chips;

b) raising another set of pins, located on the opposite side of the belt and aligned with the holes therein, into insertion in the holes;

c) raising the pins further to pass through the holes in the mask and through the passageways in the load wheels to force the chips out of the load wheel to drop down into the inventory of chips located therein; and, d) lowering the pins out of contact with the passageways and holes to allow advancement of the load wheel to the next station in the load cycle.

* * * * *